United States Patent [19]

Schmid

[11] Patent Number: 4,493,227
[45] Date of Patent: Jan. 15, 1985

[54] SELF-LOCKING DIFFERENTIAL GEAR UNIT; MORE SPECIALLY FOR MOTOR VEHICLES

[76] Inventor: Leopold F. Schmid, Leharstrasse 8/9. OG., D-7000 Stuttgart 1, Fed. Rep. of Germany

[21] Appl. No.: 345,842

[22] Filed: Feb. 4, 1982

[30] Foreign Application Priority Data

Apr. 14, 1981 [DE] Fed. Rep. of Germany ....... 3115035

[51] Int. Cl.³ .................... F16H 1/44; F16D 31/00; F16D 57/00
[52] U.S. Cl. .................... 74/711; 74/710.5; 192/58 A; 188/290
[58] Field of Search .............. 74/710, 710.5, 711, 74/713; 188/290, 293; 192/58 A, 58 B, 61

[56] References Cited

U.S. PATENT DOCUMENTS

| | | | |
|---|---|---|---|
| 1,449,562 | 3/1923 | Thompson | 188/293 |
| 2,743,792 | 5/1956 | Ransom | 188/290 X |
| 3,534,633 | 10/1970 | Chocholek | 74/711 |
| 3,686,976 | 8/1972 | Philippi | 192/61 X |
| 4,096,712 | 6/1978 | Webb | 74/711 X |

FOREIGN PATENT DOCUMENTS 1410061 10/1975 United Kingdom ................. 74/711

Primary Examiner—Leslie A. Braun
Assistant Examiner—Joseph M. Rolnicki
Attorney, Agent, or Firm—Flynn, Thiel, Boutell & Tanis

[57] ABSTRACT

The spider of a differential gear unit is joined up with one half of a hydrodynamic coupling whose other, outer half is joined up by way of step-up gearing with one half axle so that on slipping of one wheel or on rounding a corner the outer coupling half is turned at a higher speed than the half axle driving it.

5 Claims, 2 Drawing Figures

SELF-LOCKING DIFFERENTIAL GEAR UNIT; MORE SPECIALLY FOR MOTOR VEHICLES

GENERAL OUTLINE OF THE INVENTION

The present invention is with respect to a self-locking differential gear unit, more specially for motor vehicles, with a powered differential gear housing turningly bearinged in the axle gear housing, and within which the two axle bevel gear wheels for driving the axle shafts are positioned, such bevel gear wheels meshing with the differential wheels, in the case of which there is a non-positive coupling placed without the differential gear housing, for locking the differential gear unit, one coupling half of said coupling being joined with the differential gear housing and the other half being joined with one of the two axle shafts.

One purpose of the present invention is that of making a further development and better design of the hydrodynamic couplings as used in differential gear units in the prior art for self-locking units so that the gear unit is able to keep up with some tight engineering conditions, so far not met, in connection with the operation of trucks and cross-country army vehicles and busses.

For effecting this purpose and further purposes in the invention the two coupling halves of the non-positive coupling take the form of rings of bladed impellors of a hydrodynamic coupling, one of the two rings of blades being torque transmittingly joined with one of the two axle shafts by way of change speed gearing, such gearing increasing the speed of turning differential(on rounding a curve or on slip of one wheel) between the two axle shafts so that the blade ring is turned at a higher speed than the driving axle shaft. In this respect the working space shut in by the two coupling halves and full of hydrodynamic fluid is joined up by way of an aspiration valve with a store vessel for the fluid.

LIST OF FIGURES AND DETAILED ACCOUNT OF WORKING EXAMPLE OF THE INVENTION

In the figures one of a number of many possible working examples of the invention may be seen.

Figures 1, 2:
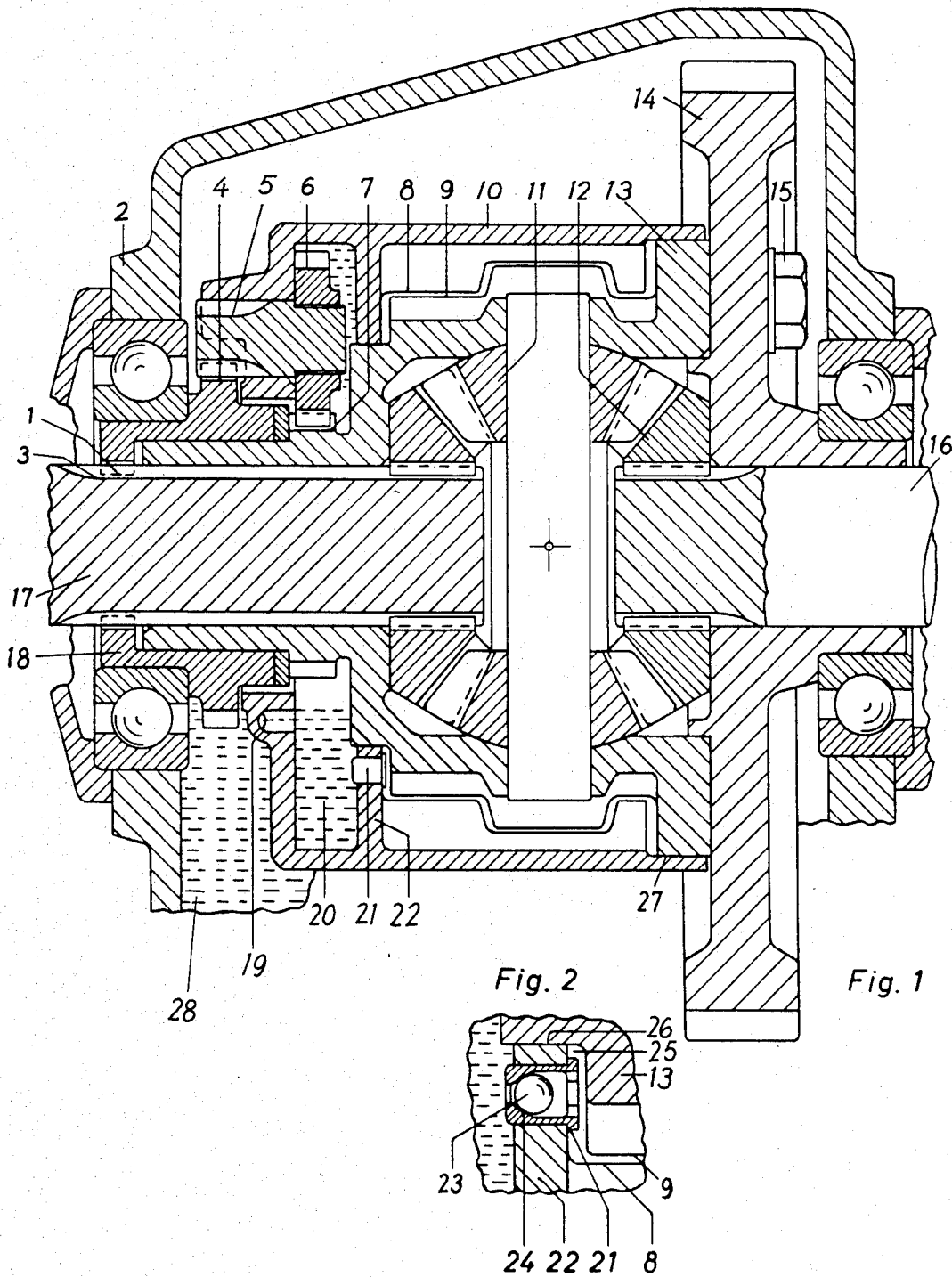
FIG. 1 is a lengthways section through a self-locking differential unit of the invention in which the two blade rings are designed using the known teaching of a hydrodynamic brake.
FIG. 2 is a lengthways section through the aspiration valve for automatically balancing leak losses, and by which the working space of the hydrodynamic brake is joined up with the store space for the hydrodynamic fluid, on an 2:1 scale.

The self-locking differential gear unit is turningly bearinged in the axle drive housing 2 and is turned by way of gear wheel 14 and is fixed in position by bolts 15. Its housing 13 is designed in the form of a ring of blades, blades 9 together with blades 8 of blade ring 10 or bladed impellor being positioned within a working space 25 formed by the two blade rings, space 25 being filled with a hydrodynamic fluid for producing the power connection as necessary for locking the differential drive unit. This hydrodynamic fluid is the same as the oil 28 with which the axle driving housing 2 is filled for oiling the differential gear unit.

In line with hydrodynamic theory, the braking torque of a hydrodynamic brake goes up directly proportional to the hydrodynamic resistance in size of the blades. Furthermore the density of the hydrodynamic fluid has a directly proportional effect. Because however the braking torque of a hydrodynamic brake goes up in a way proportional to the square of the speed of turning differential, the most important point of the present invention is to be seen in that steps are taken for increasing the speed differential between the two axle shafts 16 and 17 produced on rounding a corner or a wheel slip. The speed differential is increased by the change speed gearing made up of gear wheels 4, 5, 6 and 7 causing blade ring 10 to be more quickly turned than the driving axle shaft 17.

The workings of this change speed gearing will be more readily seen on taking a case in which the differential gear housing 13 is not moving while the axle shaft 17 is turning. Shaft 17 is drivingly joined by way of splines 1 and 3 with bearing ring 18 having gear wheel 4, meshing with gear wheel 5 bearinged in blade ring 10 for turning therewith. Because gear wheel 5 is joined to gear wheel 6 meshing with gear wheel 7 fixed on differential housing 13, a planetary gear system is produced with a ratio of 1:3.5 so that blade ring or wheel 10 is turned 3.5 times more quickly than the driving axle shaft 17. In a way dependent on the increase in the braking torque with the square of the speed differential between the two blade rings 10 and 13 there will be an increase in the braking torque, because of the change speed gearing, of 12.25 times.

The increase in the braking torque with the square of the speed differential has a desired effect furthermore on the locking torque function or curve of a self-locking differential gear unit of the present invention, because a progressively increasing slope of the self-locking curve is more in line with the designed function. The safety of busses and trucks on black ice in winter and of army vehicles in mud is greatly increased because the slipping or "running away" of one wheel is not only quickly but furthermore smoothly stopped. This property of giving not only a high locking effect but furthermore the best form of the locking curve from the point of view of theory, has furthermore made it possible to overcome a known trouble condition in the case of automobiles in connection with the fact that makers of high-price automobiles are not ready to make use of systems with a locking coefficient of 40% (necessary from the engineer's point of view), for reasons of driver comfort and in fact make do with systems with a locking coefficient of 25%, which under normal driving conditions does not give the desired effect.

For automatically keeping up with leak losses, not able to be stopped, at gaskets 26, 27, an aspiration valve 21 is used joining working space 25 with store space 20, such valve being seen in the shut condition in FIG. 2. The overpressure, present at all times when there is a speed differential between the two axle shafts 16 and 17 in the working space 25 has the effect of shutting the valve by forcing ball 23 against coned seat 24 in wall 22. Because however when the vehicle is moving along a straight line, there will no longer be any overpressure in working space 25 and because in this case even a vacuum will be produced by the leak losses, the aspiration valve is opened by the oil pressure in the turning store space 20 and when the vehicle is going along straight there will be an automatic balancing of such leak losses. Store space 20 is filled up by way of scoop holes 19.

Axle shafts 16 and 17, used for driving the wheels of the motor vehicle, are powered by way of the axle shaft bevel gear wheels 12 meshing with the differential wheels 11 supported on differential housing or spider 13.

I claim:

1. In a self-locking differential gear unit having a powered differential gear housing bearinged in an axle drive housing and within which two axle bevel wheels for driving two axle shafts are positioned, such bevel gear wheels meshing with differential gear wheels, and a non-positive coupling placed outside the differential gear housing for locking the differential gear unit, one half of said coupling being joined with the differential gear housing and the other coupling half being joined with one of the two axle shafts, the invention residing in that the two coupling halves take the form of blade rings of a hydrodynamic coupling and in that the gear unit has change speed gearing, such change speed gearing being designed for producing an increase in speed, on one of said axle shafts turning faster than the other, responsible for said one blade ring turning faster than the axle shaft driving the same.

2. The self-locking differential gear unit as claimed in claim 1 wherein a working space shut in between the two coupling halves and filled with a hydrodynamic fluid is joined up by way of an aspiration valve with a store space for the hydrodynamic fluid, formed in said gear unit.

3. A differential gear unit having:
two half axles,
a differential spider,
four meshing bevel wheels nested within said spider and forming a driving differential connection between said spider and said half axles,
a hydrodynamic coupling centered on one of said half axles and step-up gearing joining one of said half axles with said coupling for producing a torqued driving connection for turning a coupling half faster than said half axle and said spider.

4. A differential gear unit as claimed in claim 3 wherein said step-up gearing is made up of concentric gear teeth rings with different numbers of gear teeth on said spider and on said one half axle, two joined-together pinions designed for running on two of said gear rings, and a means supporting said pinions on said coupling for turning one half thereof when said one half axle and said spider are running at different speeds.

5. A differential gear unit as claimed in claim 3 wherein a working space shut in between two coupling halves and filled with a hydrodynamic fluid is joined up by way of an aspiration valve with a store space for the hydrodynamic fluid, formed in said gear unit.

* * * * *

UNITED STATES PATENT AND TRADEMARK OFFICE
CERTIFICATE OF CORRECTION

PATENT NO. : 4,493,227
DATED : January 15, 1985
INVENTOR(S) : Leopold F. SCHMID

It is certified that error appears in the above-identified patent and that said Letters Patent is hereby corrected as shown below:

Column 3, line 6; after "bevel" insert ---gear---.
line 19; change "one" to ---other---.

Column 4, line 10; after "joining" insert ---a first---.
line 13; before "half" insert ---first---.
line 17; change "one" to ---first---.
line 20; change "one" (second occurrence) to ---first---.

Signed and Sealed this

Sixth Day of August 1985

[SEAL]

Attest:

DONALD J. QUIGG

*Attesting Officer*      *Acting Commissioner of Patents and Trademarks*